United States Patent [19]

Haberer et al.

[11] 4,208,281

[45] Jun. 17, 1980

[54] METHOD OF PRODUCING ACTIVE FILTERS MORE PARTICULARLY FOR THE TREATMENT OF WATER AND WASTE WATER

[76] Inventors: Klaus Haberer, Nussbaumstrasse 4; Han-Ulrich Klen, Verdistrasse 2; Sabine Normann, Ernst-von-Harnack-Strasse 16, all of D-6200 Wiesbaden, Fed. Rep. of Germany

[21] Appl. No.: 974,441

[22] Filed: Dec. 29, 1978

Related U.S. Application Data

[63] Continuation of Ser. No. 809,857, Jun. 24, 1977, abandoned.

[51] Int. Cl.$^2$ .................. B01D 15/00; B01D 37/02
[52] U.S. Cl. ................................ 210/36; 210/40; 210/75
[58] Field of Search ............... 210/20, 36, 40, 75, 210/193, 203, 263, 290, 502–504, 506, 35, 275

[56] References Cited

U.S. PATENT DOCUMENTS

| | | | |
|---|---|---|---|
| 2,748,077 | 5/1956 | Hodan et al. | 210/203 |
| 3,252,899 | 5/1966 | Rice et al. | 210/75 |
| 3,396,123 | 8/1968 | Urban | 210/504 |
| 3,471,025 | 10/1969 | Dobson | 210/290 |
| 3,873,581 | 3/1975 | Fitzpatrick et al. | 210/24 |

*Primary Examiner*—Ivars C. Cintins
*Attorney, Agent, or Firm*—Brumbaugh, Graves, Donohue & Raymond

[57] ABSTRACT

A method of producing active filters, particularly for use in treatment of water, is disclosed. A filter bed of buoyant plastic balls having a surface to which a powdered active material capable of adsorbing dissolved impurities will adhere when subjected to liquid flow rates no greater than a first value and from which the powdered active material will be removed when subjected to liquid flow rates having a second value greater than the first value is provided. A liquid containing the powdered active material is passed through the filter bed in the upward direction at a flow rate having the first value to cause the powdered active material to be distributed on and adhere to the surfaces of the plastic balls. A liquid to be purified is passed through the filter bed in the upward direction at a flow rate lower than the first value to cause impurities to be adsorbed by the powdered active material without removing the powdered active material from the surfaces of the plastic balls. The powdered active material is removed from the surface of the plastic balls after the filter has been used by passing a liquid through the filter bed in the downward direction at a flow rate having the second value.

6 Claims, No Drawings

METHOD OF PRODUCING ACTIVE FILTERS MORE PARTICULARLY FOR THE TREATMENT OF WATER AND WASTE WATER

This is a continuation, of application Ser. No. 809,857 filed June 24, 1977, now abandoned.

The invention relates to a method of producing active filters of use more particularly in the treatment of water. The prior art already discloses operating filters with granulated physically/chemically active substances. It is also known, particularly in respect of water treatment, to use filters of granulated active carbon. Biological processes frequently take place in the carbon filters, in addition to adsorption and catalytic oxidation, and these may be advantageous for water treatment processes on the one hand, but on the other hand they entail the risk of filter contamination. Also, if the quality of the water changes, for example, special organic constituents of the water concentrated in the active carbon filter over long periods may be displaced and hence be suddenly discharged.

The use of powdered carbon has also been extensively used in water treatment processes, powdered carbon being continuously added. This necessitates only low investment cost and permits easy adjustment to changes in water quality. However, in the case of single-stage use, there is only poor utilization of adsorption capacity, and this can be appreciably improved only by longer contact times, possibly over several hours, while another disadvantage is that where powdered carbon is used the downstream filters tend to clog.

The object of this invention, therefore, is to make available a method for the production of active filters, e.g. an active carbon filter, which allows powdered carbon to be used while ensuring satisfactory utilization of the adsorption capacity. If dissolved polar organic compounds, more particularly organic acids, are to be removed, then an active filter having aluminum oxide as the active material is desirable.

The invention resides in a method of producing active filters, more particularly for the treatment of water, which is characterized in that pulverulent or very fine-grain physically/chemically active substances, more particularly adsorbents, which no longer allow direct filtration in a relatively large bed height, approximately 1–2 m, are applied, in a first preparatory step before each working period, to a support material which determines the filter structures.

In an advantageous development of the method, the pulverulent substances are applied reversibly to the support material, i.e. they can be removed therefrom on reversal of the direction of flow.

According to one embodiment of the method of making active carbon filters, the powdered carbon adsorbent is applied uniformly to the surface of the filter material of an open or closed filter through which the flow is upwards. The support material used for the pulverulent active substances is advantageously small plastics balls of low specific gravity.

A particular development of the method whereby the required good distribution of the active substances in the filter is achieved is characterized in that the filter is changed and then conditioned at a speed which is relatively high in relation to the working speed about 70 m/h in the case of powdered carbon—until the adsorbent adheres firmly to the surface of the support material and no longer escapes from the filter.

A further development of the method is characterized in that on back-washing of the filter the inactive pulverulent material charged with the adsorbed constituents is separated and completely removed from the floating filter substances.

Another development of the method is characterized in that during the conditioning phase the liquid contents of the system are recycled to avoid any loss of expensive adsorption agents, and thus no filtrate is discharged during this conditioning phase and there are therefore no water losses.

The invention also provides steps for more rational performance of the method. Accordingly, a common circuit which can be connected to or disconnected from each filter is provided for a number of filters and is equipped with a high capacity pump to achieve high speeds of flow on washing and conditioning (application of the pulverulent material to the surface of the filter material).

With these steps according to the invention it is possible uniformly to incorporate active substances, more particularly active carbon powder, uniformly in a filter bed in large quantities. A highly effective filter is thus obtained because the active carbon particles are uniformly deposited on the surface of the plastics balls, which have a very low specific gravity, and thus form an artificial active carbon filter of a large surface through which water flows upwardly until the adsorption capacity of the carbon is exhausted. In comparison with the conventional active carbon filters, there is only a short cycle in this case, and at the end of it the charged active carbon particles are again separated from the filter bed and removed from the filter by an intensive downward flow of wash water. This obviates any disadvantageous displacement effects on organic substances and any intensive filter contamination.

The washing in and conditioning operation depends on the design features of the filter (type of filter material, its bed height, and filter dimensions) and on the type and quantity of powder used. In an existing test rig, one minute was required to wash the carbon powder in using an injector, and then the filter was conditioned for 8 minutes by circulating the water at a speed of 70 m/h. The end of the conditioning operation was signalled by the turbidity at the filter outlet falling to, or below, that of the untreated water.

For filter operation the recycling circuit is disconnected and the untreated water is admitted at the required and generally much lower rate of flow compared with washing in. On back-washing in the opposite direction, the carbon particles are separated from the filter bed. The carbon, which has a higher specific gravity than water, is quickly entrained in the downward direction, while these lightweight plastics balls have high bouyancy and counteract the stream of water during back-washing. The washing speeds should be such that the filter bed clearly expands by about 15–20%. In experiments, washing was carried out for 5 to 10 minutes at a speed of about 100 m/h. The plastics balls are then in a fluidized bed but instantaneously resume their initial position when the wash water is stopped.

Highly effective active filters with good utilization of the adsorption capacity can be made with the method according to the invention. The active materials, preferably adsorbents, can be adapted without difficulty to changes in requirements, e.g. water quality at all times and the most diverse effects can be achieved by adding appropriate materials (possibly a mixture). For example, powdered carbon can be incorporated into the filter in order to remove odiferous and flavouring substances, and more particularly for the removal of chlorine and non-polar organic compounds, and pulverulent aluminum oxide can be applied to the support material in the filter in order to remove other organic compounds, more particularly organic acids.

Correspondingly, it is possible to incorporate other pulverulent physically/chemically active substances on a support material which determines the filter structures, in order thus to achieve the appropriate filter effects.

The method according to the invention gives short working cycles which obviate high costs for stocking large quantities of expensive physically/chemically active substances. At the same time, adaptation to different conditions and requirements is possible by the use of different physically/chemically active substances. The method according to the invention thus has versatile applications.

We claim:

1. A method for purifying liquids containing dissolved impurities comprising providing a filter bed of buoyant plastic balls having a surface to which a powdered active material capable of adsorbing dissolved impurities will adhere when subjected to liquid flow rates no greater than a first value and from which the powdered active material will be removed when subjected to liquid flow rates having a second value greater than the first value, passing a liquid containing the powdered active material through the filter bed in the upward direction at a flow rate having the first value to cause the powdered active material to be distributed on and adhere to the surfaces of the plastic balls, and passing the liquid to be purified through the filter bed in the upward direction at a flow rate lower than the first value to cause impurities to be adsorbed by the powdered active material without removing the powdered active material from the surfaces of the plastic balls.

2. A method according to claim 1 wherein the liquid containing powdered active material is recirculated through the filter bed to provide greater deposition of the powdered active material on the plastic balls.

3. A method according to claim 1 wherein the powdered active material is carbon.

4. A method according to claim 1 wherein the powdered active material is aluminum oxide.

5. A method according to claim 1 including the step of removing the powdered active material from the surface of the plastic balls after the filter has been used by passing liquid through the filter bed in the downward direction at a flow rate having the second value.

6. A method according to claim 5 wherein the second value of the flow rate is sufficient to cause the filter bed to expand by about 15 to 20%.

* * * * *

UNITED STATES PATENT AND TRADEMARK OFFICE
CERTIFICATE OF CORRECTION

PATENT NO. : 4,208,281
DATED : June 17, 1980
INVENTOR(S) : Haberer et al.

It is certified that error appears in the above–identified patent and that said Letters Patent are hereby corrected as shown below:

First page, Item 76, "Han-Ulrich Klen" should read --Hans-Ulrich Klein--; and

Col. 1, line 31, "where" should read --when--.

Signed and Sealed this

Ninth Day of September 1980

[SEAL]

Attest:

SIDNEY A. DIAMOND

Attesting Officer     Commissioner of Patents and Trademarks